July 9, 1935.  L. BEHR  2,007,556

MEASURING APPARATUS

Filed July 23, 1932   3 Sheets-Sheet 1

*Leo Behr*
INVENTOR

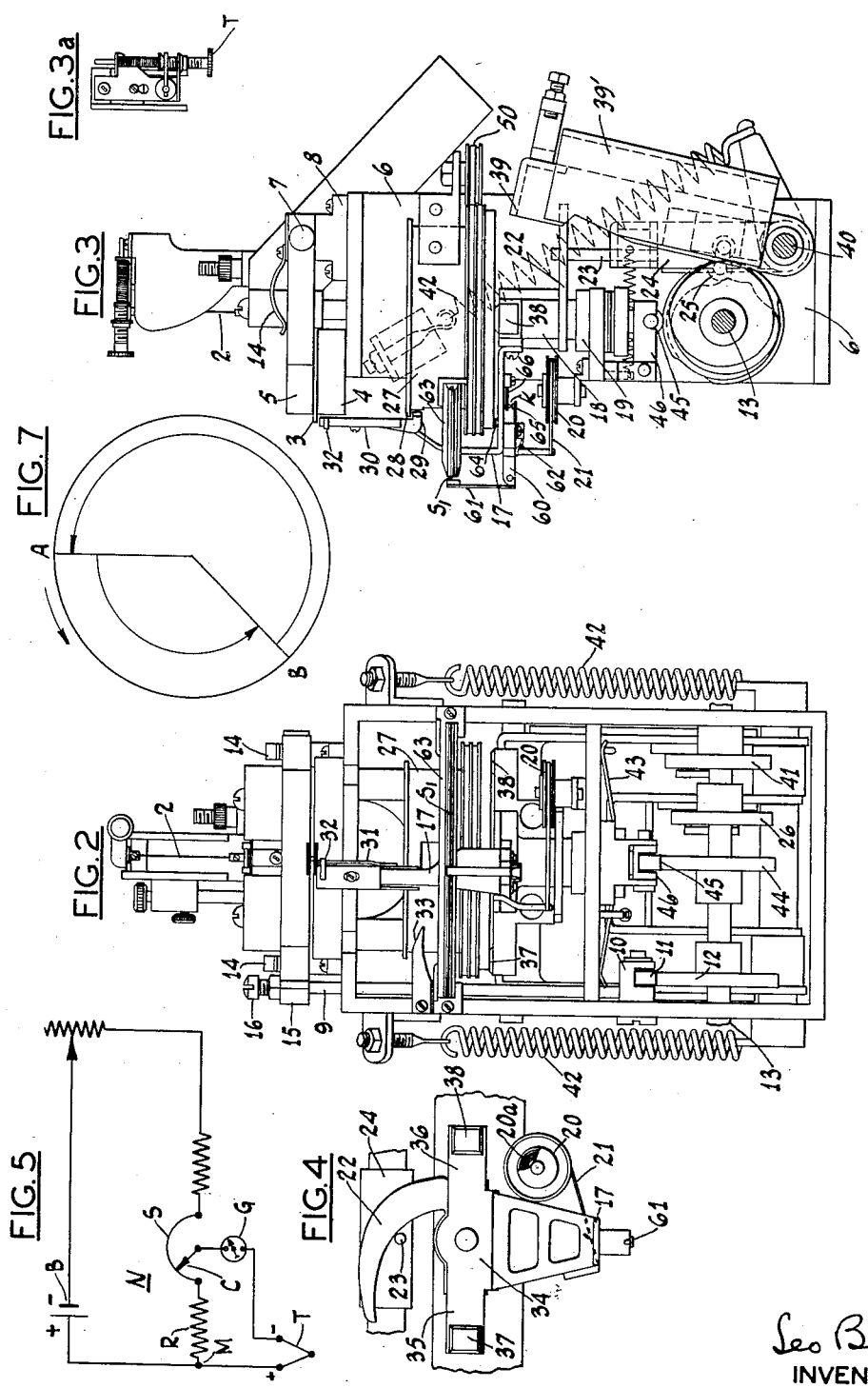

July 9, 1935.                L. BEHR                2,007,556
                       MEASURING APPARATUS
                     Filed July 23, 1932        3 Sheets-Sheet 3
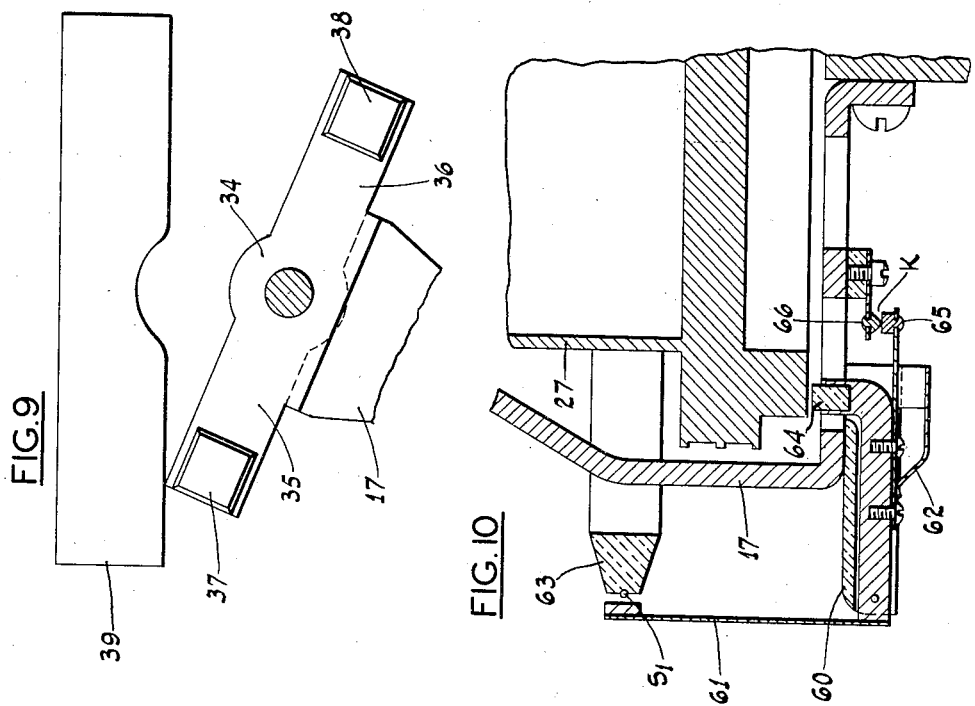
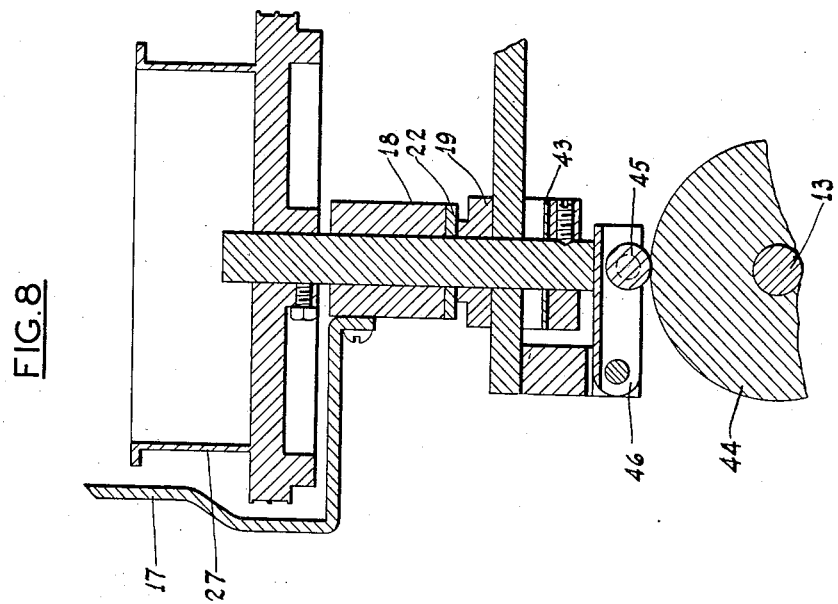
Leo Behr
INVENTOR Patented July 9, 1935

2,007,556

UNITED STATES PATENT OFFICE 2,007,556

MEASURING APPARATUS

Leo Behr, Philadelphia, Pa., assignor to Leeds & Northrup Company, Philadelphia, Pa., a corporation of Pennsylvania Application July 23, 1932, Serial No. 624,162

33 Claims. (Cl. 171—95)

My invention relates to methods of and apparatus for measuring, indicating, and/or recording the magnitudes of a physical, electrical, chemical, or other condition.

In accordance with one aspect of my invention, while a responsive element, as the needle of a galvanometer, is clamped, it is engaged by a feeler whose axis of movement is concentric with the pivotal axis of the needle, and more specifically, arrest of the feeler sets or positions a driving clutch member, preferably movable with the feeler as a unit, in accordance with the needle's deflection.

More specifically, subsequently in the cycle of operation of the apparatus, the driving clutch member while in engagement with a driven clutch member is actuated to a neutral position by a spring, or equivalent, tensioned previously in the cycle, to rebalance the apparatus, as by adjustment of a slide-wire resistance in the galvanometer circuit.

More particularly, a single feeler is periodically moved by a small force, for example, that of a light spring, from a position to one side of the neutral position of the needle until the feeler engages the clamped needle whether it be on the same or the opposite side of its neutral position, and more particularly, the feeler after engaging the needle to set the driving clutch member, is withdrawn, without disturbing the clutch setting, to permit the needle, when unclamped, to deflect in either direction from the position at which it was engaged by the feeler.

In accordance with another aspect of my invention, at the beginning of the rebalancing action there is at once introduced into the galvanometer circuit an electrical effect of such magnitude that the measuring circuit, insofar as the galvanometer is concerned, is in that condition which will obtain at the end of the slide-wire adjustment, permitting the needle, as soon as unclamped, to move to any new position; more specifically, substantially upon engagement between the feeler and the deflected needle, a contact movable in unison with the feeler engages an auxiliary slide wire to introduce a voltage into the galvanometer circuit equal to the change to be effected in the main slide wire voltage by the rebalancing operation; the auxiliary and main slide wires, when simultaneously reset by the clutch mechanism, operate differentially to keep the voltage constant in the galvanometer circuit during the resetting or rebalancing operation.

Further in accordance with my invention, the needle is clamped during each cycle of operation for a constant period, substantially less than half of the complete cycle; and throughout the remainder of the cycle the needle is free of all restraining forces, mechanical and/or electrical, and specifically, because of the effect of the aforesaid auxiliary slide wire, the needle is free, as soon as unclamped, to assume a new position corresponding with a new or further change, in the condition to be measured, occurring during the immediately preceding needle-clamping period.

My invention further resides in the methods and systems hereinafter described and claimed.

For an understanding of my invention, reference is to be had to the accompanying drawings in which:

Fig. 1 in perspective, and with parts omitted, and parts broken away, illustrates a measuring instrument constructed in accordance with the invention.

Fig. 2 is a front elevational view of parts shown in Fig. 1.

Fig. 3 is an end elevational view of the mechanism shown in Fig. 2.

Fig. 3a is a detail view, in top plan, of needle-adjusting mechanism shown in Figs. 2 and 3.

Fig. 4 is a detail view, in top plan, of the pointer feeler clutch arm assembly, shown in the preceding figures.

Figs. 5 and 6 are circuit diagrams referred to in explanation of the operation of the mechanism shown in Fig. 1.

Fig. 7 represents the time cycle of operation referred to in the description.

Fig. 8 is a detail view, in side-section, and on enlarged scale of clutch mechanism shown in Figs. 1–3.

Fig. 9 is a detail view in top plan, and on enlarged scale of the driving clutch element and its operator, shown in Figs. 1 to 3.

Fig. 10 is a detail view, on enlarged scale and in section of contact-operating mechanism shown in Figs. 1 to 3.

Figure 1:
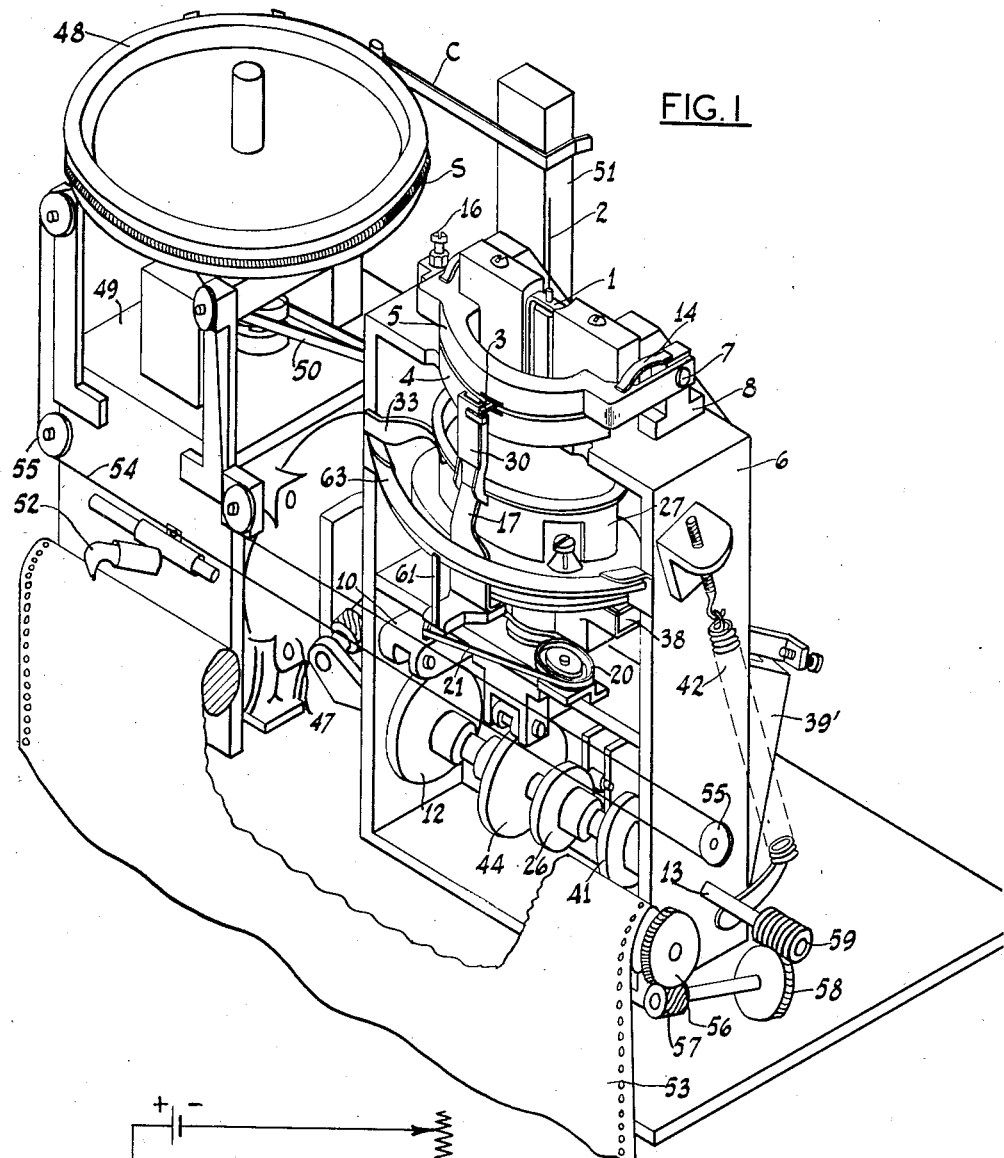

Referring to Figs. 1 to 3, the galvanometer coil 1 is suspended for rotation about a vertical axis, as by the suspension member or wire 2, so that the pointer or needle 3 of the instrument may swing in a horizontal plane in response to changes in temperature, pressure, or other condition under measurement. The pointer 3 is intermittently engaged by the clamping members 4 and 5. The lower clamping member 4, as shown, may be fastened to the frame member 6 of the instrument, while the upper clamping member 5 is pivotally mounted as at 7 to the brackets or supports 8, secured to the top face of the frame member 6. The clamping members are preferably of arcuate shape, the center of the arc being substantially coincident with the axis of rotation of the galvanometer coil 1. As more fully hereinafter pointed out, the pointer 3, for a substantial portion of the operating cycle, is free to move between the clamping members. The operating mechanism for the upper clamping member, to effect periodic clamping of the needle, once for each cycle of operation, comprises a rod 9 whose upper end engages the movable clamping member 5, and whose lower end is received by a recess in the pivoted arm 10 carrying a cam follower 11 riding on the periphery of the cam 12. (Fig. 2).

The shaft 13 to which cam 12 is secured, is driven by the motor 47 at substantially constant speed, and the gear ratio between the motor and shaft 13 is such that the shaft revolves once in every few seconds, for example, two seconds. For the majority of this time, the cam follower 11 is engaging the high part of cam 12 so that the clamping member 5 is held upward out of engagement with the needle. At a point in the cycle represented by A, Fig. 7, the cam follower 11 drops off a high part of the cam so that the clamping member 5 either under its own weight, or assisted by the biasing springs 14, swings counter-clockwise as viewed in Fig. 3, to clamp the needle. As this clamping force does not involve a direct positive driving connection to the motor, the pressure on the needle can never become excessive.

In the arrangement shown, the upper end of rod 9 enters a recess in a bracket 15 secured to member 5 to abut the lower end of an adjustable screw 16.

At the point B in the cycle, of Fig. 7, the cam follower 11 rides up on the high part of the cam effecting upward movement of rod 9 and release of the pointer 3 from the clamping members. Substantially as soon as the needle is clamped, the feeler member 17 which is secured to or integral with hub member 18 rotatably mounted upon the support 19 concentric to the axis of deflection of pointer 3, is moved away from its limiting position at the left-hand side of the instrument as viewed in Fig. 2, by a light coil spring 20a, one end of which is fastened to the drum 20 and whose other end is fastened to a stationary point. The rotation of the drum 20 is transmitted to the feeler 17 by the flexible band or strip 21. The rate of movement of feeler 17 is, however, controlled or limited by the cam member 22 which projects from the rear of the feeler assembly, Fig. 4, the inner or cam face of member 22 engaging a pin 23 projecting upwardly from the pivoted yoke 24 which carries a follower 25 bearing against the surface of cam 26 mounted on shaft 13.

The rate at which the feeler moves toward the clamped needle from its limiting position is therefore determined by the contours of the cam surfaces 26 and 22, although it is to be noted that the force effecting movement of the feeler is only that of the light spring 20a.

The feeler continues to move until it is arrested by the clamped pointer which has only to overcome the force exerted by the light spring, so that it is not subjected to any appreciable strain, from which it follows that the clamping pressure of member 4, 5 need not be great. When the feeler is arrested, the continued inward movement of pin 23 has no further effect for the remainder of the cycle as it simply moves away from the surface of cam 22.

The slightest departure of the needle from its neutral position in either direction is detectable by the feeler whereas in prior arrangements having need for mechanical clearance, only deflections sufficiently large to take up the clearance were detected and even then the measurement was not of the total deflection but only the excess beyond clearance.

The concentric arrangement of the feeler and pointer ensures that for large as well as small deflections of the needle or pointer, the distance between the arrested feeler and its neutral or central position shall be substantially proportional to the needle's deflection. In this connection it should be noted that the angle through which the needle is free to move for engagement by the feeler is unusually large; a feature which contributes to high speed of recording large changes in the measured condition and to the ability of the apparatus to record more rapidly changing conditions.

Just before the needle is released or unclamped, the member 27, whose construction and mode of operation is hereinafter more fully described, is moved downwardly, the rim 28 of the member engaging the projection 29 of the slidable tip 30 of the feeler member 17, to withdraw the feeler tip out of engagement with the needle, so that the needle may, when released from member 4, 5, move in either direction from the position at which it was engaged by the feeler. Preferably as shown, the element actually engaging the needle may be a light flexible strip 31 secured at its lower end to the slide or feeler tip 30 and with its upper end biased outwardly against a limiting stop or strip 32 fastened to the upper end of the feeler tip. The strip 31 absorbs any excess shock incident to engagement between the needle and feeler.

At a subsequent time in the cycle, with intervening operations hereinafter described, the pivoted yoke 24, Fig. 3, is swung in clockwise direction by cam 26, the pin 23 in its rearward movement effecting clockwise rotation, as viewed in Fig. 4, of the feeler 17 toward its initial or limiting position. This movement of the feeler retensions the spring 20a for the next pointer-seeking movement of the feeler at the beginning of the next cycle of operation. As the feeler approaches this initial position, the projection 29 (Fig. 3) rides on the upper surface of the stationary cam member 33 (Fig. 2) returning the feeler tip into the plane of movement of the pointer. The member 27, in the meantime, as hereinafter explained, has been moved upwardly so that its rim 28 does not impede this upward movement of the slidable tip 29.

The rotatable support 18 for the feeler 17 also carries a driving clutch member 34 having the oppositely extending arms 35, 36 to the upper faces of which are attached the shoes 37, 38 of cork, or other suitable material. As the clutch member moves with the feeler as a unit, the arrest of the feeler by the pointer establishes a definite relation between the deflection of the pointer and the position or setting of the clutch member 34. When the galvanometer needle is in its neutral position, as shown in Fig. 2, the feeler is arrested when the arms of the clutch member 34 are parallel to the bar 39, or equivalent, extending between the upper ends of the arms 39' pivoted at 40 to the frame 6. Under these circumstances, when in the operating cycle, the cam 41 permits the springs 42 to effect counter-clockwise rotation of arms 39', the bar 39 in its forward movement does not effect rotation of member 34 in either direction. If, however, the needle is clamped out of its neutral position, it arrests the feeler when either one or the other of the clutch arms 35, 36, depending upon the sense of deflection of the needle, is in the path of movement of the bar 39. Accordingly, as the bar 39 moves inwardly, it engages one of the clutch arms and restores the driving clutch member to its neutral or normal position, i. e., parallel to the face of bar 39.

In this resetting of clutch member 34 to neutral, bar 39 engages the nearer arm 35 (or 36) and rotates member 34 until the other arm 36 (or 35) also engages bar 39 and stops any further movement. The slightest displacement of member 34 from its neutral position in either direction as determined by the pointer 3 and feeler 17, is sufficient to ensure its reverse movement while in engagement with the driven member 27, by arm 39. It should be noted that the sensitivity and accuracy for even the smallest deflections is not limited by mechanical clearances.

Prior to this inward movement of the arm 39, and subsequent to the needle clamping, the driven clutch member 27 is moved downwardly by spring 43, its lower surface engaging the clutch shoes 37, 38 of the driving clutch member. The timing of this clutch engaging movement is controlled by the cam 44 which engages a follower 45 carried by an arm 46 against which rests the lower end of the shaft upon which the driven clutch member 27 is mounted. This shaft passes through the supporting member 19 for the driving clutch member 34, so that the driving and driven clutch members are concentric to each other, and to the axis of deflection of the galvanometer needle. The concentric disposition of the clutch members, the feeler, and the pointer or needle 3 provides compactness and facilitates procurement of movements of the driven member 27 which are always proportional to the needle's deflection.

Accordingly, when the bar 39 moves inwardly, the clutch members are already in engagement, so that in restoring the driving clutch member to its neutral position, shown in Fig. 4, the driven clutch member 27 is moved through an angle directly related to the prior deflection of the galvanometer needle and in a sense depending upon the sense of the needle deflection. Upon completion of the restoring action, the bar 39 is returned to the position shown in Fig. 3, in order that it may not obstruct the movement of the feeler assembly towards its initial or starting position, as effected by pin 23, as above previously described.

Briefly, the sequence of operations is as follows: Needle 3 is clamped by members 4 and 5; the feeler 17 moves until arrested by the clamped pointer which effects a setting of the clutch member 34, the clutch members 34 and 27 are brought into engagement; bar 39 restores the feeler and clutch assembly to the position shown in Fig. 4 and with it the driven clutch member; the feeler then is moved to its initial position for resumption of the next cycle; shortly after the engaging movement of the driving clutch member the galvanometer needle 3 is released so that for all the subsequent operations which consume the major portion of the operating cycle, the needle is free to assume a position determined by any change in the condition being measured, which has occurred since the needle was last clamped.

For description of the effect of the operation of the apparatus, it is assumed that it is used in a potentiometer type measuring system, such as shown in Fig. 5, for recording temperature changes, although it is to be understood of course, that the apparatus has a multitude of other uses, and can be employed in other types of measuring networks.

In Fig. 5 the voltage developed by the thermocouple T, which is a function of the temperature to which it is subjected, is balanced against the potential in a potentiometer network N. Specifically, one terminal of the thermocouple is connected to one terminal of a resistance R which in series with the slide-wire S, is traversed by current from the battery B. The other terminal of the thermocouple is connected through the galvanometer G to the slide wire contact C. To measure the temperature to which the thermocouple is subjected, the slide-wire contact is adjusted until the galvanometer G no longer deflects. If the slide wire scale is calibrated in temperature, direct readings can be obtained.

The apparatus previously described automatically balances the network to measure and record the temperature. The galvanometer G of Fig. 5, is the galvanometer of the instrument of Figs. 1 to 3. The slide-wire S of Fig. 5 may be carried by a drum 48, Fig. 1, rotatably mounted upon the frame 49 and mechanically coupled to the driving clutch member 27 by the flexible strip or band 50. The slide wire contact C is carried by a stationary support 51 extending from the base of the instrument.

Accordingly, in the operation of the instrument, the needle 3 deflects in response to difference between the thermocouple voltage and the voltage between points M and C of the potentiometer circuit, and the resulting rotation of the driving clutch member 27 is in such sense as to effect rotation of the slide-wire drum to restore balance. For recording the changes in temperature there may be provided any of the usual arrangements, for example, the pen or stylus 52 engaging the record sheet 53 is moved by the cord 54 which passes over the idler pulleys 55 and encircles a drum, not shown, rotatable with the slide wire drum 48. The chart is moved at a suitably low rate by the speed reducing train 56—59.

With the arrangement thus far described, although the needle is mechanically free as soon as released by the clamping members 4 and 5, the system is nevertheless not in such condition that the needle can at once deflect to a position indicating an intervening temperature change, for during rebalancing operation, effected by the movement of the slide wire S, the potentiometer voltage is constantly changing, thus masking the effect of any change of thermocouple voltage in response to a temperature change.

It is characteristic of the arrangement which will now be described that substantially concurrently with arrest of the feeler by the pointer, the measuring system is at once brought to the same condition that it is to be upon completion of movement of the slide wire, (the extent of which movement and change of potentiometer voltage is predetermined by the position at which the feeler is arrested) so that the needle as soon as unclamped may at once move towards a position truly representative of any temperature change which has occurred since it was last clamped. As the needle is free both of mechanical restraint and rebalancing disturbances for the major part of the cycle of operation, it has ample time to assume this position before it is again clamped. This long free time of the needle is of importance, for if the galvanometer is sufficiently sensitive to measure small changes, its natural period of vibration is long and unless the free time of the needle in the complete cycle is greater than the natural period of the needle, the needle may be clamped before it has assumed its proper position.

Referring to the drawings, for illustration of a preferred arrangement to accomplish the result the feeler 17 carries a bracket 60 to the outer end of which is pivotally mounted a contact 61 which is biased, as by spring 62, out of engagement with the auxiliary slide wire S1 mounted upon the arcuate support 63.

When the clutch member 27 is moved downwardly as previously described, to effect engagement with the movable clutch member 34 which has been set by the arrest of the feeler, it presses against pin 64 to swing the contact 61 in clockwise direction, Fig. 10, to bring it in engagement with the slide wire S1. The position at which the contact 61 engages the auxiliary slide wire is therefore directly related to the pointer or needle position and therefore to the extent to which the driven clutch member is to be moved during rebalancing. At the same time that the engagement is made, the contacts 65, 66 of a switch K are separated for a purpose hereinafter described.

When rebalancing of the main slide wire S has been completed, as above described, and the clutch member 27 is moved upwardly by its cam 44, the biasing spring 62 moves contact 61 out of engagement with the auxiliary slide wire S1 and reestablishes engagement between the contacts 65 and 66 of the switch K. This relation exists until in the next cycle of operation, the feeler is again arrested by the pointer to determine a new position of the driving clutch member and of the contact 61 for the auxiliary slide wire.

Figure 6:
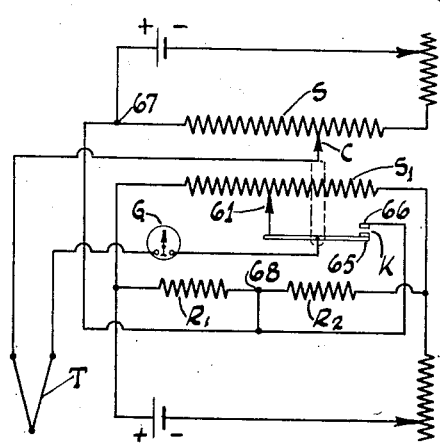

Referring to Fig. 6, there is shown a measuring system which is fundamentally the same as that of Fig. 5 except modified to include the auxiliary slide wire for the purposes above specified. When the contacts 65 and 66 of switch K are closed, the connections are exactly the same as Fig. 5, that is, the thermocouple or other responsive device is connected in series with the galvanometer directly across the main slide wire S. When in the cycle of operation, as above described, the contact 61 of the auxiliary slide wire is moved into engagement with it, and the switch K opened, the galvanometer G, instead of being connected directly to the point 67 of the potentiometer network is now connected to that point through a Wheatstone bridge network which includes the auxiliary slide-wire S1. Specifically, two arms of the bridge are formed by the fixed resistances or impedances R1, R2 while the other two arms of the bridge are comprised of the portion of the slidewire S1 to the left and right of contact 61. If the galvanometer needle is in its neutral or central position when engaged by the feeler, the contact 61 engages a point on the auxiliary slide wire contact S1 for which the Wheatstone bridge is in balance. The points 61 and 68 are therefore of the same potential and there is no modifying action introduced for none is needed. Niether is there any movement of the main slide wire. However, if the needle is to one side or the other of its neutral position, when engaged by the feeler, the contact 61 engages a point on the slide wire S1 to unbalance the Wheatstone bridge network in one sense or the other depending upon the sense of deflection of the needle from neutral position, and the extent of bridge unbalance corresponds to the extent of needle deflection. Moreover, the unbalanced voltage of the bridge network which is introduced into the galvanometer circuit is equal to the voltage change to be effected by the movement of the main slide wire contact C to restore balance of the system. As a result, the measuring system insofar as the galvanometer is concerned, is in the same condition as soon as the needle is unclamped, as it is to be at the end of the adjustment of the main slide wire contact C.

During the rebalancing movement of the main slide wire, the contact 61 is moved toward the position for which the Wheatstone bridge is balanced, for it is directly carried by the feeler 17, which is returned to its central position, as above described, for each rebalancing operation. Therefore, the auxiliary voltage introduced into the galvanometer system by the Wheatstone bridge is brought to zero as the slide wire voltage is brought to the value predetermined by the previous galvanometer deflection. Otherwise expressed, the contacts C and 61 operate simultaneously and differentially so that during the rebalancing operation the voltage of the system which is in opposition to the thermocouple voltage, remains constant. The rebalancing of the main slide wire, does not therefore affect the galvanometer needle or cause any disturbance which prevents it from deflecting to the proper position.

The galvanometer is entirely free of mechanical and electrical restraint for a large portion of the operating cycle, from point B to A, Fig. 7. In view of this long free time in the operating cycle, the apparatus may be operated at high speed, for example, one cycle for every one or two seconds, and yet the needle will have ample time in each cycle to fully deflect, even though the galvanometer is of high sensitivity having a long period.

Because of features previously described, absence of mechanical clearances in the system between the feeler and driving clutch member, and/or between the resetting member for the driving clutch member, the concentric arrangement of the pointer and feeler, large angle of movement of the pointer, the instrument is able to record very small changes in the measured condition, and at the same time is capable of rapidly coming to balance for large and rapid changes of the condition, i. e., substantially fewer steps are necessary for the instrument to record a change in temperature, from one magnitude to a substantially different magnitude.

To maintain high precision of measurement, it is only necessary from time to time to make a single, simple adjustment which compensates for the sum total of all wear between the pointer and feeler, between bar 39 and clutch member 34, etc. This adjustment consists in simply turning the torsion-head screw T (Fig. 3a) of the galvanometer suspension, until with no current flowing through the galvanometer coil, there is no stepping of the recorder pen, or equivalent.

In any event, adjustment would be needed from time to time even if there were no wear, to correct for shift in the galvanometer zero.

What I claim is:

1. In apparatus of the character described, an instrument having a deflecting element, means for intermittently clamping said element, and a feeler independent of said clamping means for engaging said element while clamped having its axis of movement concentric to the axis of movement of said element.

2. In apparatus of the character described, a galvanometer having a pointer, means for intermittently clamping said pointer, a feeler independent of said clamping means having its axis of movement concentric with the axis of movement of said pointer, and means independent of said pointer for effecting movement of said feeler in timed relation to said clamping means whereby the feeler engages the needle while clamped.

3. In apparatus of the character described, an instrument having a deflecting element, means for intermittently clamping said element, a feeler independent of said clamping means, means independent of said deflecting element for effecting movement of said feeler to engage said element while clamped, a driving clutch member movable in unison with said feeler and set in accordance with the deflection of said element when the feeler is arrested by the clamped deflecting element, a driven clutch member, means for effecting engagement of said clutch members when said driving clutch member is set, and oscillatory structure for engaging and moving said driving clutch member while engaged by said driven clutch member to an extent predetermined by the deflection of said element.

4. In apparatus of the character described, an instrument having a deflecting element, means for intermittently clamping said element, a feeler independent of said clamping means having its axis of movement concentric with the axis of movement of said element, a driving clutch member movable in unison with said feeler, a driven clutch member having its axis of rotation concentric with said deflecting element, means independent of said deflecting element for effecting movement of said feeler to engage the needle while clamped to set the driving clutch member, and means for thereafter effecting engagement and movement of the clutch members.

5. In apparatus of the character described, a galvanometer having a pointer, means for intermittently clamping said pointer, a feeler having its axis of movement concentric with the pivotal axis of said pointer, driving and driven clutch members having their axis of rotation concentric with the pivotal axis of said pointer, and means for effecting in sequence, movement of the feeler to engage the clamped pointer to set the driving clutch member, movement of at least one of said clutch members along said pivotal axis to effect engagement of the clutch members, and rotation of the clutch members in a sense and to an extent predetermined by the deflection of said element.

6. In apparatus of the character described, a galvanometer having a pointer, means for intermittently clamping said pointer, a feeler having its axis of movement substantially concentric to the axis of movement of said pointer, and means for moving said feeler beyond a limit of movement of said pointer against a small biasing force and for permitting reverse movement of the feeler by said small biasing force, which reverse movement is arrested upon engagement with the clamped needle.

7. In apparatus of the character described, a galvanometer having a pointer, means for intermittently clamping said pointer, a feeler having its axis of movement substantially concentric to the axis of movement of said pointer, a driving clutch member movable in unison with said feeler, means for intermittently moving said feeler against a small biasing force beyond a limit of movement of said pointer and for permitting reverse movement of the feeler by said small biasing force, which reverse movement is arrested upon engagement with the clamped needle to set said driving clutch member, a driven clutch member, and means for effecting engagement of the set driving clutch member with said driven clutch member and for effecting movement thereof in accordance with the deflections of said pointer.

8. In apparatus of the character described, a galvanometer having a pointer, means for intermittently clamping said pointer, driving and driven clutch members, means for intermittently tensioning spring structure, a feeler, means for operating said feeler to effect setting of one of said clutch members upon engagement of said feeler with the clamped pointer, and means for thereafter permitting the tension spring structure to move said clutch members while in engagement with each other.

9. In a system of the character described, in which the cycle of operation comprises a measuring period during which a pointer responds to change of condition being measured, and a period during which the system is rebalanced, the method of increasing the effective measuring period of the cycle which comprises, substantially before completion of said rebalancing, introducing an effect simulating rebalance to permit the pointer to respond to any further change of said condition, and reducing said effect as the rebalancing progresses substantially to eliminate the effect of rebalancing upon the pointer.

10. In a system of the character described, in which the cycle of operation comprises a period during which a pointer responds to change of a condition being measured, a period during which the deflected pointer is located by a feeler, and a rebalancing period, the method which comprises substantially concurrently with location of the pointer by said feeler, introducing an effect, whose magnitude and sense correspond to the pointer's position, to simulate rebalance, and reducing the effect as the rebalancing progresses to leave the pointer free to respond to subsequent change of said condition without disturbance by the rebalancing operation.

11. In a system of the character described, in which the cycle of operation includes clamping of a pointer deflected in response to change of condition under measurement, location of the clamped pointer by a feeler, and rebalancing of the system at the new magnitude of the condition, the method which comprises, before the needle is unclamped, introducing an effect of magnitude and sense determined by the needle's deflection to simulate rebalance whereby the needle when unclamped responds to any further change of the condition, and reducing the effect as the rebalancing progresses substantially to eliminate the effect of the rebalancing upon the needle.

12. The method of measuring the magnitude of a variable condition which comprises unbalancing a measuring system in accordance with change of said condition to effect deflection of a pointer, rebalancing the system to measure any further change of the condition, and before completion of the rebalance, introducing an effect simulating rebalance to permit the needle substantially immediately to respond to said further change before rebalance is effected.

13. The method of measuring the magnitudes of a variable condition which comprises unbalancing a measuring system in accordance with change of said condition to effect deflection of a pointer, progressively introducing an effect into said system to obtain rebalance thereof and whose sense and magnitude is determined by the sense and extent of the pointer deflection, substantially concurrently with said deflection introducing an effect simulating rebalance to permit said needle to respond to further change of said condition, and reducing the magnitude of said second effect as said first effect increases substantially to avoid disturbance of the needle by the rebalancing.

14. A measuring system comprising a galvanometer and an adjustable impedance, mechanism responsive to deflection of said galvanometer for adjusting said impedance to rebalance said circuit, and means included in said circuit during adjustment of said impedance and adjusted concurrently therewith by said mechanism to simulate rebalance during actual rebalancing.

15. A measuring system comprising a galvanometer and an adjustable impedance, mechanism responsive to deflection of said galvanometer for adjusting said impedance to rebalance said circuit, a second adjustable impedance included in circuit before balancing to simulate rebalance, and disengageable means connecting said impedances during rebalance to effect differential adjustment thereof.

16. A measuring system comprising a galvanometer having a pointer, a balanceable circuit including said galvanometer and an adjustable impedance, an auxiliary adjustable impedance, a movable feeler arrested by said pointer to determine the effective value of said auxiliary impedance, switch mechanism operated substantially concurrently with arrest of said feeler to include said auxiliary impedance in circuit to immediately rebalance the system, a source of power, and a disengageable connection between said source of power and said first adjustable impedance, including an element positioned by the feeler, said source of power changing said first impedance by an amount determined by the setting of said element and concurrently varying the second impedance to maintain balance of said system.

17. A measuring system comprising a galvanometer having a pointer movable in response to a change to be measured, a periodically operating feeler adapted to engage said pointer, driven and driving clutch members, whose relative positions while disengaged is determined by engagement of said feeler with said movable member, a balanceable circuit including said galvanometer and an adjustable impedance mechanically connected to said driven clutch member, a second adjustable impedance, temporarily included in said circuit substantially upon said engagement of the pointer and feeler to simulate rebalance, and means for thereafter actuating said driving clutch member to vary said first adjustable impedance to effect balance thereby and concurrently varying said second adjustable impedance to maintain the balance.

18. A measuring system comprising a galvanometer having a pointer, a balanceable circuit including said galvanometer and an adjustable impedance, means for periodically clamping said pointer, an oscillating feeler arrested by the clamped pointer to position an element thereafter actuated to vary said impedance, and an auxiliary impedance introduced into said circuit substantially upon arrest of the feeler by said pointer and excluded from circuit when said first impedance has been adjusted to rebalance the circuit.

19. A measuring system comprising a balanceable network, a galvanometer in a branch of said network, a slide wire continuously included in said network and adjustable to effect rebalancing thereof, a second slide wire, a switch for including said second slide wire in said branch, and means mechanically coupling said slide-wires for movement in unison during adjustment of said first slide wire.

20. A measuring system comprising a balanceable network, a galvanometer in a branch of said network having a pointer deflecting in response to change in a condition being measured, a slide wire included in said branch upon deflection of and adjusted in accordance with said pointer immediately to rebalance the network, and a slide wire continuously in circuit, thereafter adjusted for rebalance.

21. A measuring system comprising a galvanometer having a pointer, a balanceable measuring circuit including said galvanometer and an adjustable impedance, mechanism responsive to deflection of said galvanometer for adjusting said impedance to produce a voltage change of magnitude determined by the extent of said deflection, an impedance included in said circuit upon deflection of the galvanometer and prior to adjustment of said impedance for substantially immediately producing a voltage change equal to said aforesaid change, and means for mechanically coupling said impedances progressively to reduce the voltage change produced by said second impedance as the adjustment of the first impedance progresses.

22. Apparatus of the character described comprising a galvanometer having a pointer, means for periodically clamping said pointer, a feeler for locating the clamped pointer, a slidewire, and a contact therefor movable with said feeler.

23. Apparatus of the character described comprising a galvanometer having a pointer, means for periodically clamping said pointer, a feeler for locating the clamped pointer, a slide wire, a contact therefor movable with said feeler, and means operable after arrest of the feeler by the pointer for effecting movement of said contact into engagement with said slide wire.

24. Apparatus of the character described comprising a galvanometer having a pointer, means for periodically clamping said pointer, a feeler for locating the clamped pointer, a slide wire, a contact therefor movable with said feeler, means operable after arrest of the feeler by the pointer for moving said contact into engagement with said slide wire, and means for thereafter adjusting said contact while in engagement with said slide wire to a neutral position.

25. Apparatus of the character described comprising a galvanometer having a pointer, means for periodically clamping said pointer, a feeler for locating the clamped pointer, a slide wire, a contact therefor movable with said feeler, and means for moving said contact into engagement with said slide wire upon arrest of the feeler by said pointer, for moving the contact while in engagement with said slide wire to a neutral position, and for thereafter moving said contact away from said slide wire.

26. Apparatus of the character described comprising a galvanometer having a pointer, a measuring circuit including said galvanometer, means for periodically clamping said pointer, a feeler for locating the clamped pointer, a slide wire, a contact therefor movable with said feeler, and a switch operated substantially upon arrest of said pointer by the feeler to include in said circuit a portion of said slide wire determined by the position of said contact.

27. Apparatus of the character described comprising a galvanometer having a pointer, a circuit including said galvanometer and a main slide wire, means for periodically clamping said pointer, clutch elements, a feeler for locating the clamped feeler to determine the relative positions of said clutch elements, an auxiliary slide wire, a contact therefor movable with said feeler, means for effecting engagement of said clutch elements and inclusion in said circuit of a portion of said auxiliary slide wire determined by the position of said contact, and means for moving the engaged clutch elements differentially to adjust the main slide wire and said auxiliary slide wire.

28. Apparatus of the character described comprising a pointer, means for periodically clamping said pointer, an oscillating feeler having an extension for engaging the pointer while clamped, and means for retracting said feeler extension after location of the pointer to permit the pointer when unclamped to deflect without obstruction by said feeler.

29. Apparatus of the character described comprising a pointer, means for periodically clamping said pointer, driving and driven clutch elements, an oscillating feeler having an extension for engaging the pointer while clamped to determine the relative positions of said clutch elements while disengaged from each other, said extension being retracted from the path of said pointer by engaging movement of the clutch elements, and means for resetting said extension before the feeler again moves to locate said pointer.

30. In apparatus of the character described, an instrument having an element adapted to deflect in either direction from a neutral position, means for intermittently clamping said element, a single feeler having a range of movement including the range of deflection of said element, means for periodically moving said feeler to a limiting position of its range of movement, means for moving said feeler from said position until arrested by said element on either side of said neutral position, a clutch member rotatable about an axis concentric to the axis of deflection of said element and movable with said feeler to be set thereby on either side of its neutral position in accordance with the position of the clamped element arresting said feeler, and a clutch member engaged by said first clutch member after setting thereof and movable therewith to its neutral position.

31. A device of the class described comprising a shaft, a clutch disc fixed to the shaft, a second clutch disc slidable along the shaft and fixed to rotate therewith, a member pivoted to move freely of the shaft substantially about the axis of the shaft, means for moving the member about its pivot, means for clutching the discs together, and means for actuating one of the clutch discs to cause the turning of the shaft to a degree predetermined by the degree of pivotal movement of the member.

32. A device of the class described comprising a shaft, a member pivoted to move freely of the shaft in opposite directions substantially about the axis of the shaft, means for moving the member in opposite directions about its pivot, and means for thereupon causing the turning of the shaft in a direction opposite to the direction of movement of the member.

33. A device of the class described comprising a shaft, a member pivoted to move freely of the shaft substantially about the axis of the shaft, means responsive to varying conditions for moving the member about its pivot to varying degrees, a constantly rotating shaft, and means controlled by the constantly rotating shaft for causing the turning of the first-named shaft to a degree predetermined by the degree of pivotal movement of the member.

LEO BEHR.